United States Patent
Sumangala et al.

(10) Patent No.: US 11,500,678 B2
(45) Date of Patent: Nov. 15, 2022

(54) VIRTUAL FIBRE CHANNEL PORT MIGRATION

(71) Applicant: HEWLETT PACKARD ENTERPRISE DEVELOPMENT LP, Houston, TX (US)

(72) Inventors: Bannur Subraya Sumangala, Karnataka (IN); Vellalore Sreenivasa Prasad, Karnataka (IN); Paulose Kuriakose Arackal, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 817 days.

(21) Appl. No.: 16/132,587

(22) Filed: Sep. 17, 2018

(65) Prior Publication Data

US 2020/0089536 A1 Mar. 19, 2020

(51) Int. Cl.
*G06F 15/173* (2006.01)
*G06F 9/50* (2006.01)
*G06F 3/06* (2006.01)
*G06F 9/455* (2018.01)

(52) U.S. Cl.
CPC .......... *G06F 9/5011* (2013.01); *G06F 3/0662* (2013.01); *G06F 9/45558* (2013.01); *G06F 9/505* (2013.01); *G06F 9/5077* (2013.01); *G06F 2009/4557* (2013.01)

(58) Field of Classification Search
CPC ............. G06F 11/2007; G06F 11/2005; G06F 13/426; G06F 2201/815
See application file for complete search history.

(56) References Cited

U.S. PATENT DOCUMENTS

| 7,933,993 | B1 | 4/2011 | Skinner |
| 9,571,586 | B2 | 2/2017 | Anumalasetty et al. |
| 9,672,070 | B2 | 6/2017 | Amann et al. |
| 10,756,958 | B2* | 8/2020 | Wang ...................... H04L 43/16 |
| 2009/0025007 | A1 | 1/2009 | Hara et al. |

(Continued)

OTHER PUBLICATIONS

Pandey, V. et al., "VMready," (Research Paper), Implementation of a Profile Based Virtual Port Switching Framework, 2011, 7 pages, http://www.itc22.com/fileadmin/ITC22_files/DC-CAVES-2-VMR.pdf.

*Primary Examiner* — Hua Fan
(74) *Attorney, Agent, or Firm* — Nolte Intellectual Property Law Group

(57) ABSTRACT

This disclosure is directed to a computer-implemented method, systems, and devices to migrate a virtual fibre channel (VFC) connection from a first hardware communication path to a second hardware communication path within a fibre channel (FC) network prior to failure of a device in the first hardware communication path. For example, a hypervisor database may contain health status with respect to recoverable failure incidents across host bus adaptor (HBA) ports for a source HBA port and a target HBA port associated with a first VFC connection using the first hardware communication path. If it is determined that a number of recoverable failure incidents on at least one component in the first hardware communication path has occurred, migration of the first VFC connection from the first hardware communication path to a second hardware communication path may be initiated prior to actual hard failure.

20 Claims, 13 Drawing Sheets

(56) References Cited

U.S. PATENT DOCUMENTS

| | | |
|---|---|---|
| 2009/0157984 A1 | 6/2009 | Hara et al. |
| 2011/0239014 A1* | 9/2011 | Karnowski ........... G06F 1/3287 |
| | | 713/320 |
| 2012/0060010 A1 | 3/2012 | Shimozono et al. |

* cited by examiner

VIRTUAL FIBRE CHANNEL PORT MIGRATION

BACKGROUND

In the field of network computing, multiple computers or systems may be designed to work as a group to provide functionality and redundancy for a distributed network application or environment. Network attached storage may be used to allow different network servers (and applications running on those servers) to have access to shared high capacity storage. One such implementation is referred to as a storage area network (SAN). Fibre Channel (FC) is an example of a protocol that may be used to provide high speed access and reliable data exchange between devices and a SAN. FC is a high-speed network technology (commonly running at 1, 2, 4, 3, 16, 32, and 128 gigabit per second rates) providing in-order, lossless-delivery of raw block data, primarily used to connect computer data storage to servers. Fibre. Channel may be used in SANs in commercial data centers.

FC networks may form what is referred to as a "switched fabric" because they operate in unison as one big switch. FC typically runs on optical fiber cables within and between data centers but may also run on copper cabling for shorter distances. Fibre Channel Protocol (FCP) is a transport protocol that predominantly transports commands of a higher level protocol (e.g., SCSI—"Small Computer System Interface" for distributed systems, FICON—"Fibre Connection" for mainframe systems) over FC networks, SANs are often designed with dual fabrics to provide fault tolerance. In a fault tolerant implementation example, two (or more) completely separate fabrics may be operational and if the primary fabric fails, then a second fabric becomes the primary. FC topologies include a number of ports that are connected together, A "port" in FC terminology is any entity that actively communicates over the network, not necessarily a hardware port. This port may be virtualized (e.g., because it is not physical hardware) and may be implemented in a device such as disk storage, a Host Bus Adapter (HBA), or a Converged Network Adaptor (CNA) to provide a network connection on a server or an FC switch. A CNA is a single Network Interface Card (NIC) that contains both an FC host bus adapter (HBA) and a TCP/IP Ethernet NIC. A CNA may be used to connect servers to both FC-based storage area networks (SANS) and Ethernet-based local area networks (LANs).

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which.

DETAILED DESCRIPTION

Figure 1:
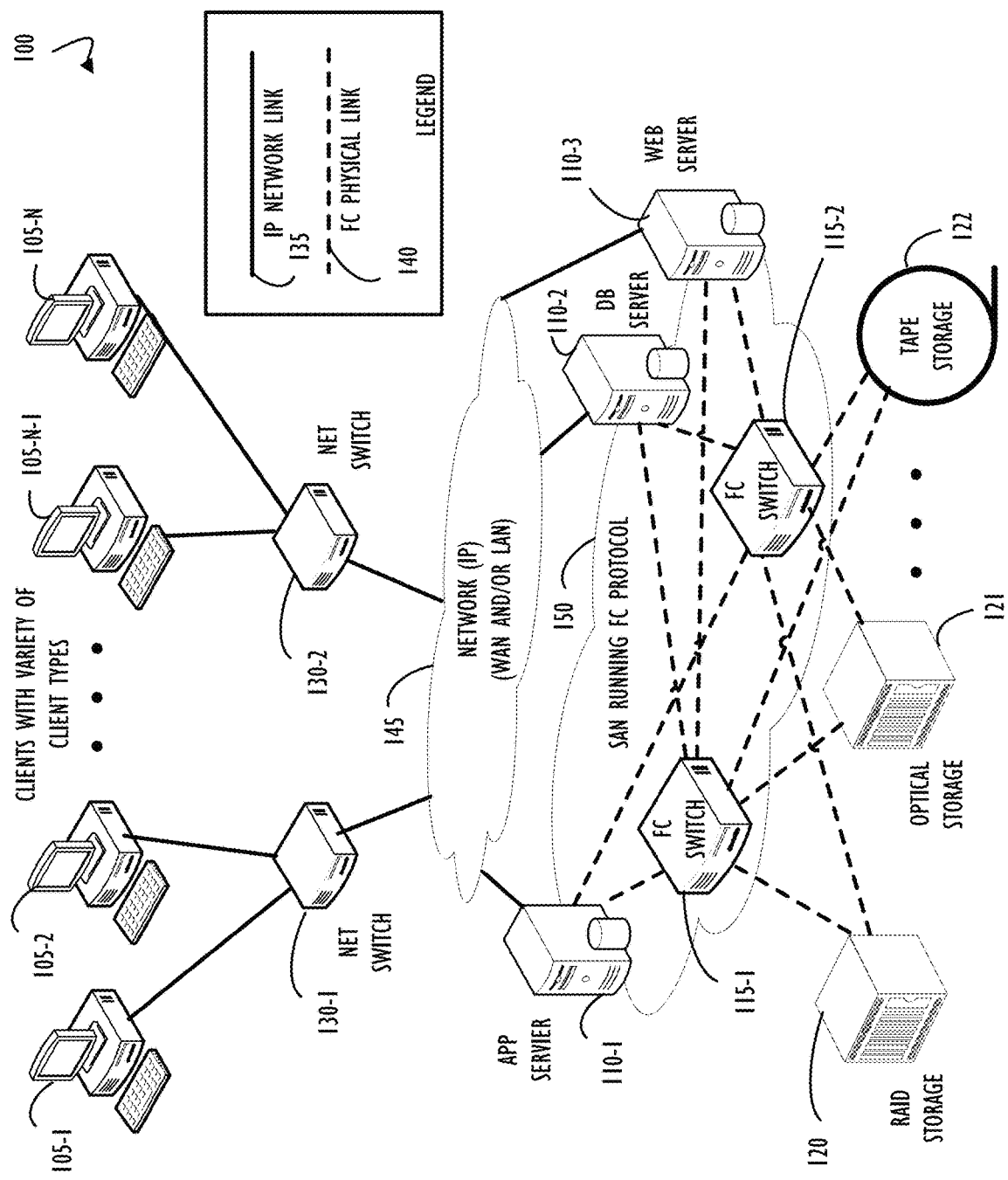
FIG. 1 is a functional block diagram representation of a network including client computers, communication network switches (e.g., IP based network), and a SAN running an FC protocol, according to one or more disclosed implementations.

Examples of the subject matter claimed below will now be disclosed. In the interest of clarity, not all features of an actual implementation are described in this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

As mentioned above, a SAN may be used to share data between storage servers and application servers that execute programs, for example using data from the SAN. A SAN allows for a dedicated device (or set of devices) to provide data for a number of applications and application servers and typically allows for scaling and fault tolerance. In addition to providing data from data servers to application servers, SAN protocols may also enable data transfer between the storage systems (e.g., to provide or increase fault-tolerance, allow for scaling, and allow for distributed data access that may improve performance, among other things. Further, with a long-distance SAN, data transfer over a SAN may be extended across geographic locations. At a low level, a SAN usually provides access to block-based storage in an efficient and reliable manner using the above-mentioned FCP.

In contrast to a storage area network, one approach for allowing access to data includes deploying direct attached storage (DAS) inside servers. The DAS approach has both advantages and disadvantages. Some of the advantages are that DAS storage may be accessed over very short dedicated and low latency inter-connectors. In a DAS system there may be fast and reliable access to devices. However, a disadvantage to DAS implementations may include increased management, low utilization capacity, and restrictions based on a limited number of devices such as disk drives. For example, a server may only support connecting a predefined fixed number of storage devices. Accordingly, a properly configured SAN may maintain at least some of the advantages of DAS while addressing certain disadvantages of DAS storage. In particular scalability and redundancy may be addressed by a SAN infrastructure. In short, the SAN technology may provide a high speed, low-latency storage network that is relatively contention free when compared to a DAS environment. Further, a SAN may allow large number of drives to be pooled and shared between multiple hosts.

As mentioned above, some SANs may be configured to address the limitations of a direct-attached storage (DAS) environment. Unlike a DAS environment, where the compute systems "own" the storage, SANs may enable both consolidation and sharing of storage resources across multiple hosts (e.g., compute resources). This shared architecture may improve the utilization of storage resources compared to a DAS environment and reduce the total amount of storage that an organization purchases and manages. With consolidation, storage management may become more centralized and less complex, which may further reduce the cost of managing information on persistent storage (e.g., disk arrays, databases, file servers, etc.).

A SAN may span over wide locations. This enables organizations to connect geographically dispersed compute systems and storage systems. For example, two data centers may be configured remotely from each other to serve as a primary and backup data center. In a situation of failure, as an example, the backup data center may take over for the primary if there is an issue (e.g., hardware failure or natural disaster) at the primary data center location. The long-distance SAN connectivity may enable the compute systems (e.g., compute resources such as application servers, web servers, etc.) across locations to access shared data. The long-distance connectivity may also enable the replication of data between storage systems that reside in separate locations. Replication over long-distances may help in protecting data against local and regional disaster. Further, long-distance SAN connectivity may facilitate remote backup of application data. Backup data may be transferred through a SAN to a backup device that may reside at a remote location. These long distance SAN implementations may use various kinds of SAN implementations such as Fibre Channel SAN (FC SAN), or FC over Ethernet (FCoE). Fibre Channel SAN (FC SAN) may also simply be referred to as SAN. That is, a SAN that uses Fibre Channel protocol (FCP) for communication. FCP may be used to transport data, commands, and status information between the compute systems and the storage systems. FCP may also be used to transfer data between the storage systems.

SAN devices communicate using network protocols that are transmitted on a physical network via a network interface such as an HBA or CNA. FC HBAs, as well as CNAs, are available for all major open systems, computer architectures, and buses, including peripheral component interconnect (PCI) and SBus. Some network interfaces are OS dependent, Each HBA has a unique World Wide Name (WWN), which is similar to an Ethernet MAC (Media Access Control) address in that it uses an Organizationally Unique Identifier (OUI) assigned by the IEEE, However, WWNs are longer (8 bytes) than MAC addresses. There are two types of WWNs on an HBA; a node WWN (WWNN), which can be shared by some or all ports of a device, and a port WWN (WWPN), which is necessarily unique to each port.

NPIV (N_Port ID Virtualization) is an FC feature whereby multiple FC node port (N_Port) IDs can share a single physical N_Port. This virtualization allows multiple FC initiators to occupy a single physical port, easing hardware requirements in SAN design, especially where virtual SANS are called for. This implementation strategy allows each virtual server to see its own storage and no other virtual server's storage, NPIV is defined by the Technical Committee T11 in the Fibre Channel-Link Services (FC-LS) specification.

Normally (e.g., without virtualization) N_Port initialization proceeds using the following sequence of events. First, an N_Port sends a fabric login (FLOGI) to address 0xFFFFFE to obtain a valid address. This fabric login function is similar to how a dynamic host protocol (DHCP) works for an Internet Protocol (IP) network. Next, an N_Port sends a port login (PLOGI) to address 0xFFFFFC to register this address with the FC name server Thirdly, an N_Port sends a state change registration (SCR) to address 0xFFFFFD to register for state change notifications.

When there is virtualization with NPIV, the above process may continue with the following handshake style actions. First, an N_Port sends a fabric discovery (FDISC) to address 0xFFFFFE to obtain an additional address. Next, an N_Port sends PLOGI to address 0xFFFFFC to register this additional address with the name server. Finally, an N_Port sends SCR to address 0xFFFFFD to register for state change notifications. This process may be repeated for any additional virtual ports that need to, be established within the FC network.

As mentioned above FDISC is an abbreviation for Fabric Discovery, or "Discover Fabric Service Parameters", which may sometimes be considered to be a misleading name in this context. In short, FDISC performs the same function as FLOGI. A physical N_Port is used to connect equipment ports to the fibre channel fabric (usually an optical network port but may be copper cable in some cases).

As outlined above, NPIV allows for registration of multiple World Wide Port Names (WWPNs) and N_Port IDs that are supported by a single fibre channel host bus adaptor. In a Virtual Machine (VM) environment, this allows guest, servers to present a different world wide name to the storage area network, giving virtual servers their own isolated storage. In addition to offering better storage isolation and traceability, one of the advantages of NPIV in server virtualization environments is workload mobility. That is, the virtual port WWNs associated with a VM may be moved between physical FC ports during a VM migration, during failures at the physical ports, etc. In other words, a migration of a virtual fibre channel port may cause the communication on that port to be transferred from a first hardware communication path to a second hardware communication path. In some cases, based on the techniques of this disclosure, the second hardware communication path may be used to bypass a potentially failing device or to maintain a proper quality of service (QOS) for a communication port (i.e., the virtual FC port). Changing from a first hardware communication path to a second hardware communication path may include altering the path for a virtual connection (referred to as a Virtual FC Connection or "VFC") such that at least one component (e.g., an interconnecting component such as a switch or an originating/receiving component such as an HBA) is not used in the second hardware communication path. In short, the removed component may be bypassed by substituting another component (possibly a redundant instance of the "same" component) to replace functionality of the removed component. Thus, the second hardware path may provide consistent communication for the VFC but traverse a different interconnect of the network.

In some implementations, FC adapters may provide an option to allot absolute % (percentage) of link bandwidth to virtual ports created on a physical host bus adapter. Utilizing this capability, a system administrator may assign dedicated bandwidth for storage traffic to meet the needs of different VM workloads and fulfill the required SLAs. For example, more critical workloads may be assigned to ports having a dedicated bandwidth determined to support anticipated maximum traffic throughput for that workload. This disclosure outlines systems and techniques that represent an improvement to the art of SAN implementations, in part, by providing mechanisms to improve high availability and maintain SLAs (e.g., QOS mandates) of each virtual fibre channel ports usage.

In some disclosed implementations, data collection and analytics may be used to trigger timely migration off virtual fibre channel ports between HBAs, for example, to support balanced workload mobility and implement an effective bandwidth management strategy. In one example implementation, a predictive failure analytical analysis may indicate that a particular HBA (or other component in a hardware communication path) may be about to fail. For example, a hardware component on a first hardware communication path may start producing intermittent error events. Based on a recognition that intermittent errors may be an indication of future failure, a migration from the first hardware communication path to a second hardware communication path may be initiated. The second hardware communication path may provide the same access to data as the first hardware communication path but utilize different intermediary components (e.g., different HBA, different FC switch, or some other different interconnecting component in the network). Accordingly, the second hardware path may have completely healthy components (e.g., not producing intermittent errors) and be more likely to maintain operational state (as opposed to the hardware component predicted to fail).

In a specific implementation example, consider that a VM hypervisor may be allowed to set an absolute bandwidth on each of the multiple virtual fiber channel ports carved out of a physical HBA. The bandwidth may be specified as a percent share of the physical port's link speed. In this way, the VM may be able to operate with guaranteed speeds assigned to each of the virtual ports. However, a link speed change or link speed drop of physical ports may occur as an unpredictable event in SAN environments. If this were to happen, SLA's may be breached when there is a drop in the port's operating speed such that all of the virtual ports may not maintain their minimum designated throughput speed. Specifically, if a first virtual port has been allotted 50% bandwidth of 16 Gb HBA port, that would translate to 8 Gb bandwidth for the first virtual port. A renegotiation and speed change at the physical link hardware component may result in bandwidth drop at the physical HBA. In this example, there would be a corresponding bandwidth drop to the virtual ports (including the first virtual port). If the physical link speed drops from 16 Gb to 8 Gb, the first virtual port's effective allotted bandwidth drops to 25% of the original bandwidth, which is 4 Gb rather than the 8 Gb, that was available prior to the physical link speed change. Clearly, this may be an issue if the SLA for an application utilizing this first virtual port required a 6 Gb throughput.

Another problem that may be addressed by techniques of this disclosure is the success rate of virtual port migrations. For seamless migration in VM contexts, the source/target ports may be configured within the same SAN and switches (e.g., across a similar hardware communication path). Also, after a migration the VFC continues to communicate within the same SAN. Because the same pWWN gets migrated from a first instance of a VFC to a second instance of a VFC, the first instance of the pWWN would optimally be gracefully cleaned up from source network interface (e.g., HBA-S) and the SAN so that attributes of the first instance and second instance do not exist at the same time. That is, the first instance should be completely shut down (and have its attributes cleared) prior to the second instance becoming operational within the same SAN and connected to the same target network interface (e.g., HBA-T). It has been observed that If the cleanup of a pWWN from HBA-S (e.g., first instance cleanup) is not complete prior to the second instance operating thru the HBA-T, potential data integrity issues may occur. Further, because pWWN migration (without the techniques of this disclosure) may be attempted after critical failures have been detected on HBA-S (e.g., an actual hardware failure), important cleanup operations of attributes (e.g., pWWN) from the HBA-S may not be able to be completed successfully. Simply put, because the HBA-S has failed, a proper cleanup may not be possible and result in artifacts in the SAN not being properly cleared. As a result of these undesired artifacts (e.g., orphaned attributes), the SAN may also fail and prevent a successful migration.

To address QoS SLA's and link speed changes, one possible implementation technique is disclosed to migrate the Virtual Fibre Channel ports from one HBA to another HBA if the physical bandwidth gets dropped inadvertently (or unexpectedly). Speed drop on an HBA may be caused by multiple factors, such as PCI interconnect lane speed, number of PCI lanes, FC port speeds, etc. In any case, most implementations of a SAN initiate an event from the HBA firmware or platform firmware to the HBA OS driver upon any speed change. In disclosed implementations, this event may then be propagated to the hypervisor. In response to analyzing the event to see if corresponding QoS requirements may be in jeopardy, the hypervisor, implemented with the techniques of this disclosure, may take appropriate action of auto migrating the VFC's to different hardware communication paths that have available bandwidth to maintain the QoS requirements (and SLA). Additionally, the example hypervisor may also update the HBA statistics in a database maintained to coordinate available communication paths and SLA requirements. It is also possible that a port may have a reduced speed for a short period of time or for some ports to have recurring intermittent speed changes. Each of these situations may be associated with metrics stored in a hypervisor statistics database to allow analysis operations to determine when (or if) to migrate VFCs.

In another example implementation, that may be combined with the above-mentioned QoS implementation, port failures may be predicted (e.g., based on error events prior to actual hardware failure) and proactive migration may be performed to maintain availability of VFCs in case of ultimate hardware failure. In this example implementation, an HBA driver may send error notifications to a hypervisor for recoverable errors, such as, link fluctuations, firmware, or port/link errors etc. Error analysis may be performed to analyze events and determine potential failure of critical components of the configuration, such as firmware, Cable and SFP's (e.g., cables and plugs), peripheral component interconnect express (PCIe) connectivity, etc. If the count of these errors exceeds a configurable threshold (e.g., number of recoverable errors over a time period), the disclosed failure analysis functions associated with a hypervisor may predict the near-term failure of the port. As a result of a predicted (forward looking) failure, migration of VFCs may be initiated proactively. Predictive analysis and proactive migration may improve functionality of a SAN, in part, because initiation of migration from the failing device (e.g., source HBA) may take place while that source HBA is still operational (possibly in a degraded state). Even though the source HBA may be in a degraded state, there may be a high success rate with respect to cleanup operations being gracefully completed. As mentioned above, graceful cleanup may be significant, in part, because even though source and target ports are physically distinct after migration (e.g., a different HBA-Source and HBA-Target may be used to implement a new hardware communication path for the VFC after migration), the pWWN remains the same after migration. This same pWWN has to communicate via the same SAN environment to end storage devices (even after a failover operation that may occur in the future and result in a portion of the devices associated with the initial hardware communication path becoming active again for this VFC).

Having the above understanding of VFCs within a SAN environment, and techniques to maintain QoS (and corresponding SLAs), using proactive migration, a detailed implementation example is explained below with reference to the FIGs. Further, an example implementation for proactive migration based on potential (e.g., predicted) hardware component failure is also explained. These example implementations may be implemented, independently or together, within a SAN to improve the functioning of the SAN environment. These example implementations are not limited to any particular SAN environment and different types of SAN environments (e.g., FC SAN, FCoE, FICON, etc.) may benefit from the techniques of this disclosure.

Referring now to FIG. 1, a functional block diagram 100 is shown to illustrate a network including client computers, communication network switches (e.g., IP based network), and a SAN running an FC protocol, according to one or more disclosed implementations. The flow control mechanism in FC SAN delivers data as fast as the destination buffer is able to receive it, without dropping frames. FC also has very little transmission overhead. The FC architecture is highly scalable, and theoretically, a single FC SAN can accommodate approximately 15 million devices. The network of FIG. 1 illustrates only a few devices, but many additional devices may also be present in a SAN environment. FC SAN physical components include network adapters, cables, and interconnecting devices (e.g., FC Switch 115-1 and FC Switch 115-2). These components provide the connection network (e.g., SAN 150) between the storage system (e.g., raid storage 120, optical storage 121, and tape storage 122) and hosts (e.g., servers and client devices 105-1, 105-2, through 105-N-1, and 105-N).

All FC switches (e.g., FC Switch 115), regardless of the manufacturer, provide a common base set of services as defined in the FC standards. These services are available at certain predefined addresses (some of which are mentioned in the connection sequences described above). These services include Fabric Login Server, Fabric Controller, Name Server, and Management Server. Specifically, Fabric Login Server: It is located at the predefined address of FFFFFE and is used during the initial part of the node's fabric login process. Name Server (formally known as Distributed Name Server): is located at, the predefined address FFFFFC and, is responsible for name registration and management of node ports. Each switch exchanges its Name Server information with other switches in the fabric to maintain a synchronized, distributed name service. Fabric Controller: Each switch has a Fabric Controller located at the predefined address FFFFFD. The Fabric Controller provides services to both node ports and other switches. The Fabric Controller is responsible for managing and distributing Registered State Change Notifications (RSCNs) to the node ports registered with the Fabric Controller. If there is a change in the fabric, RSCNs are sent out by a switch to the attached node ports. The Fabric Controller also generates Switch Registered State Change Notifications (SW-RSCNs) to every other domain (switch) in the fabric. These RSCNs keep the name server up-to-date on all switches in the fabric. Management Server: FFFFFA is the FC address for the Management Server. The Management Server is distributed to every switch within the fabric. The Management Server enables the FC SAN management software to retrieve information and administer the fabric.

Fabric services define three login types:

Fabric login (FLOGI) is performed between an N_Port and an F_Port (fabric port). To log on to the fabric, a node sends a FLOGI frame with the WWNN and WWPN parameters to the login service at the predefined FC address FFFFFE (Fabric Login Server). In turn, the switch accepts the login and returns an Accept (ACC) frame with the assigned FC address for the node. Immediately after the FLOGI, the N_Port registers itself with the local Name Server on the switch, indicating its WWNN, WWPN, port type, class of service, assigned FC address, and so on. After the N_Port has logged in, it can query the name server database for information about all other logged in ports.

Port login (PLOGI) is performed between two N_Ports to establish a session. The initiator N_Port sends a PLOGI request frame to the target N_Port. Upon acceptance, the target N_Port returns an ACC to the initiator N_Port. Next, the N_Ports exchange service parameters relevant to the session.

Process login (PRLI) is also performed between two N_Ports. This login relates to the FC-4 upper level protocols (ULPs), such as SCSI. If the ULP is SCSI, N_Ports exchange SCSI-related service parameters.

Returning to FIG. 1, it is not necessary for all devices interacting with a SAN environment to be connected directly to the SAN. For example, end-user devices such as client devices 105-1 through 105-N of block diagram 100 may be connected via an additional network such as an Internet Protocol (IP) network 145 that is implemented as a local area network (LAN) and/or a wide area network (WAN). To facilitate this type of connectivity, an IP-based network switch 130-1 may be used to connect a first set of client devices. Other client devices may be connected by another network device (or via another network), switch such as network switch 130-2 that may also be IP-based but may be a bridge to, and support, additional protocols (e.g., token ring, session initiation protocol (SIP), etc.). Although not explicitly shown in block diagram 100, client devices may represent client devices supporting a client application (as opposed to an end-user) for a client-server based application. Client devices may execute many different types of operating systems (e.g., Unix-based or Windows-based). In some implementations, server style computers such as a mainframe or application server may execute a client portion of a client-server application.

Continuing with FIG. 1, several server-class machines are illustrated as different types of servers connected to SAN 150 running an FC protocol. For example, Application server 110-1 may support applications for a corporate environment to provide functionality for end-users on client devices 105-1 through 105-N. DB server 110-2 may provide access, via a database control program executing on DB server 110-2, to a database stored in the SAN or locally accessible to DB server 110-2. Web server 110-3 may support a web server application and provide information to web browsers to support web-based implementations of applications. Each of these functional components, and many others, may be performed by dedicated servers or by a server performing any combination of these types of functions. In each case, the servers, as illustrated in block diagram 100, may be connected to both a communication network (e.g., IP network 145 with connections illustrated as solid lines 135) and a SAN (e.g., FC protocol SAN 150).

Within SAN 150 of FIG. 1, FC switch 115-1 is illustrated to support a first set of connections (e.g., dashed lines 140) for a first fabric connected to all illustrated servers and storage devices. FC switch 115-2 is illustrated to support a second set of connections (also dashed lines 140) for a second fabric connected to all illustrated servers and storage devices. In this example, the two FC switches 115-1 and 115-2 may serve as a primary/backup for each other, or they may balance load between the two fabrics with each of the switches available to maintain connectivity if the other fails. Finally, SAN 150 of block diagram 100 is illustrated to include at least three types of storage including raid storage 120, optical storage 121, and tape storage 122. Other types of storage are also possible as illustrated by the ellipses between optical storage 121 and tape storage 122. As explained throughout this disclosure, many types of storage may be connected to a SAN to provide persistent data storage for any number of other devices of differing types and architectures.

Figure 2:
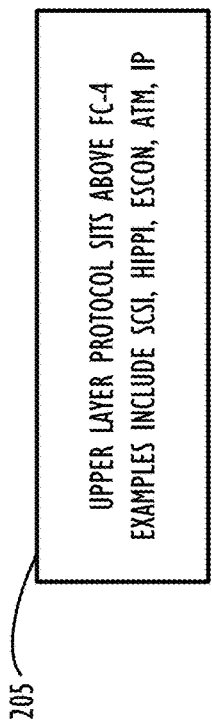
FIG. 2 is a block diagram representing a protocol layer model to describe layers of the FC communication model (which is different than the open system interconnect OSI module used for typical TCP/IP networks such as the Internet), according to one or more disclosed implementations.
Figure 3:
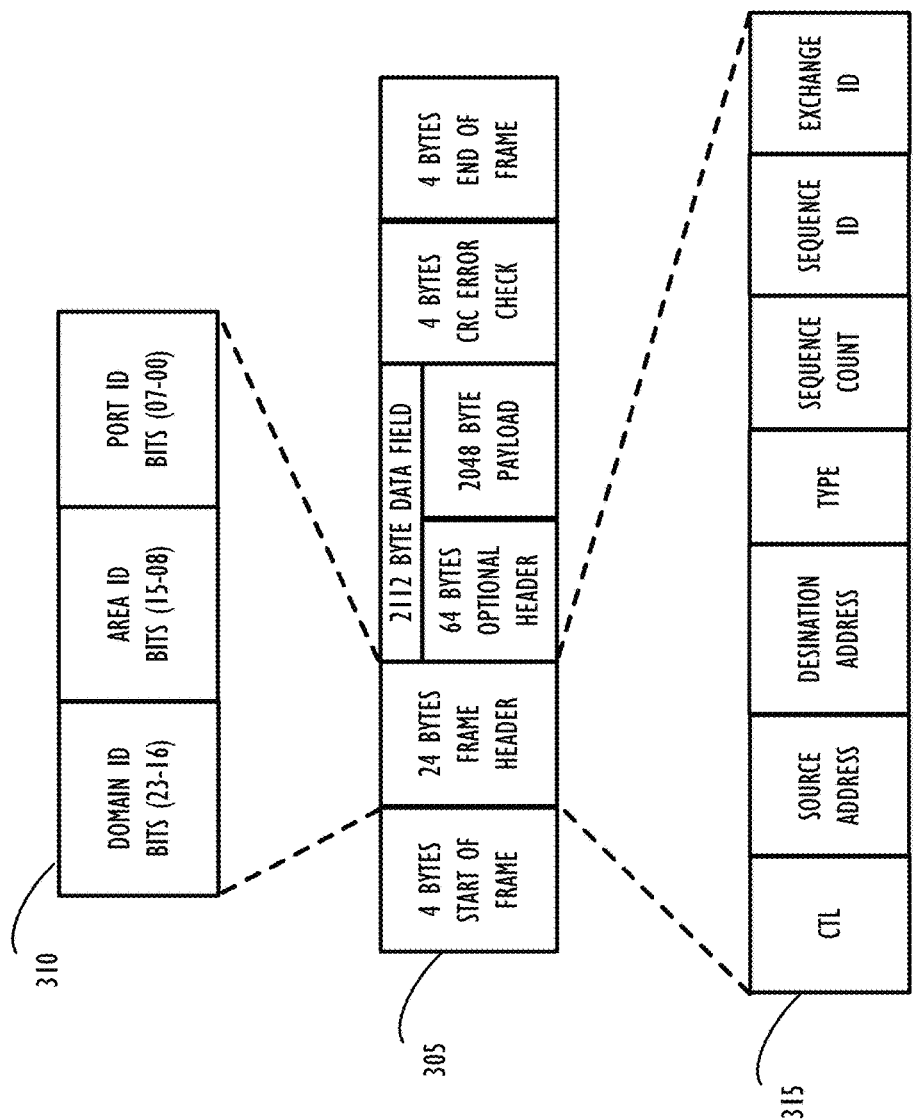
FIG. 3 is a block diagram representing a frame structure including addressing information for communication over an FC network, according to one or more disclosed implementations.

Referring now to FIGS. 2 and 3, block diagram 200 illustrates a representation of a protocol layer model to describe layers of the FC communication model (which is different than the open system interconnect OSI module used for typical TCP/IP networks such as the Internet), according to one or more disclosed implementations. Block diagram 300 of FIG. 3 illustrates a representation of a frame format and details of a frame header with respect to FCP, according to one or more disclosed implementations.

The FC communication model includes five FC layers as illustrated in table 210 that include layers FC-0 through FC-4. Additional upper layer protocols (ULPs) are illustrated by block 205. Basically, FC-0 represents the physical layer of an FC network. FC-1 represents the first protocol layer that controls encoding and frame synchronization. FC-2 represents flow control, addressing and frame structure. FC-3 is reserved for common services that may not be implemented in all FC networks. FC-4 represents a mapping interface to map the ULPs (e.g., provide translation) such as SCSI, high-performance parallel interface (HIPPI), enterprise systems connection (ESCON), asynchronous transfer mode (ATM), IP, etc. As explained above, an FC network may support many upper layer protocols with the FC network responsible for efficient block based lossless data transfer for those protocols.

Frame (see 305 of FIG. 3): A frame is the fundamental unit of data transfer at FC-2 layer. An FC frame consists of five parts: start of frame (SOF), frame header, data field, cyclic redundancy check (CRC), and end of frame (EOF). The SOF and EOF act as delimiters. The frame header is 24 bytes long and contains addressing information for the frame. Block 310 illustrates a high-level breakdown of the contents of the frame header and block 315 illustrates a more detailed breakdown of portions of the frame header. The data field in an FC frame contains the data payload, up to 2,112 bytes of actual data—for example the SCSI data. The CRC checksum facilitates error detection for the content of the frame. This checksum verifies data integrity by checking whether the content of each frame is received correctly. The CRC checksum is calculated by the sender before encoding at the FC-1 layer. Similarly, it is calculated by the receiver after decoding at the FC-1 layer.

As mentioned above, an FC address is dynamically assigned when a node port logs on to the fabric. The FC address has a distinct format and is included in the frame header portion of an FC frame (see block 310 and block 315). The first field of the FC address contains the domain ID of the switch. A domain ID is a unique number provided to each switch in the fabric. Although this is an 8-bit field, there are only 239 available addresses for domain ID because some addresses are deemed special and reserved for fabric services. For example, FFFFFC is reserved for the name server, and FFFFFE is reserved for the fabric login service. The area ID is used to identify a group of switch ports used for connecting nodes. An example of a group of ports with common area ID is a port card on the switch. The last field (as illustrated in block 310), the port ID, identifies the port within the group. Therefore, the maximum possible number of node ports in a switched fabric is calculated as: 239 domains×256 areas×256 ports=15,663,104 ports.

Every FC switch in a fabric needs a domain ID. This domain ID is a numeric string that is used to uniquely identify the switch in the fabric. These domain IDs can be administratively set or dynamically assigned by the principal switch in a fabric during reconfiguration. These Domain ID must be a unique IDs within a fabric and should be used for each switch within a single fabric. A principal switch may represent a main switch in a fabric that is responsible for managing the distribution of domain IDs within the fabric.

Figure 4A:
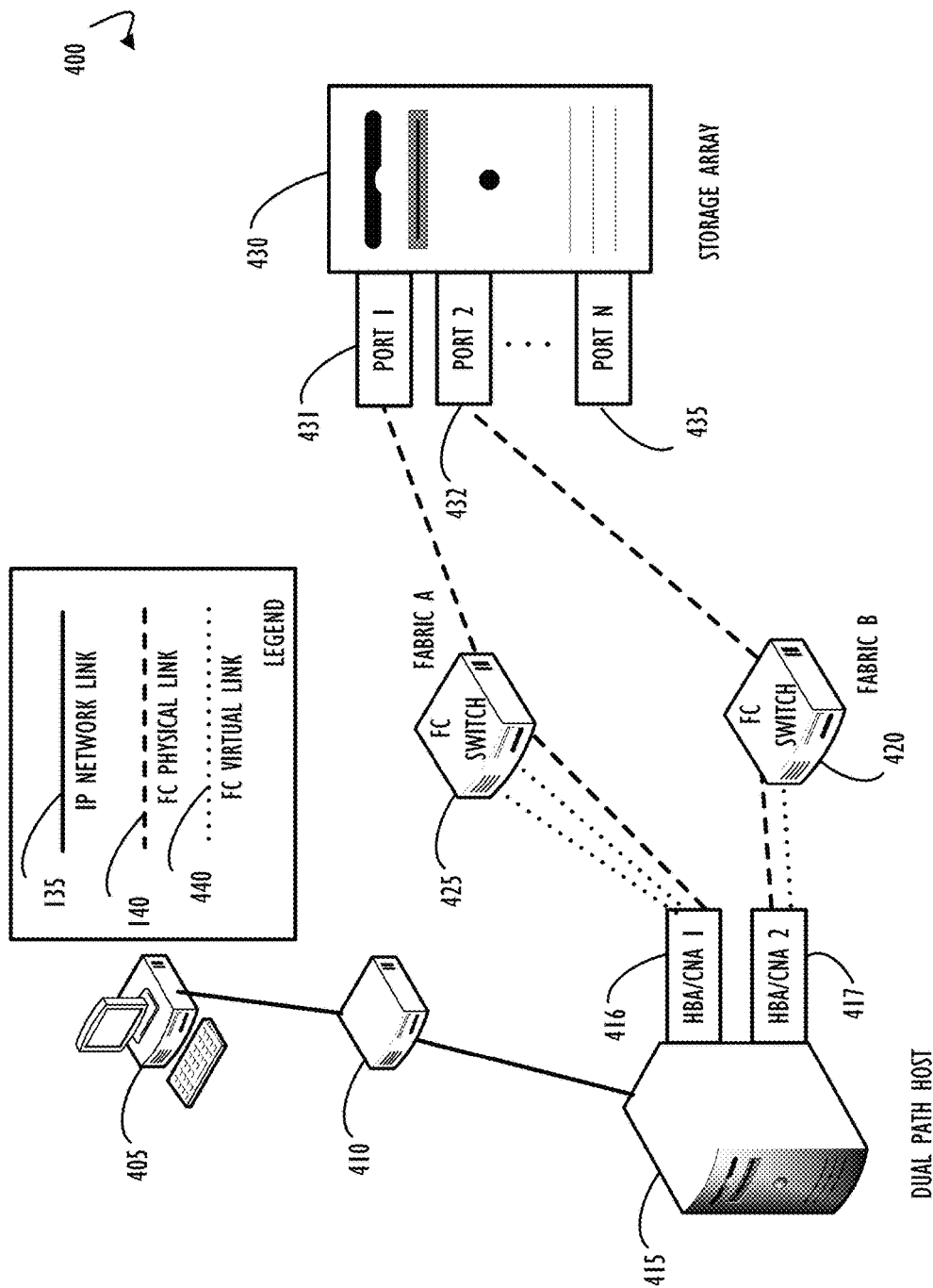
FIG. 4A is a block diagram representation of a distributed network environment including multiple computers (e.g., systems) and a simplified FC network including both physical FC connections and virtual FC (VFC) connections (e.g., communication links), according to one or more disclosed implementations.

Referring now to FIG. 4A, a diagram of network 400 illustrates a representation of a simplified distributed network environment including multiple computers (e.g., a client device 405 and a server device 415) and a simplified FC network, according to one or more disclosed implementations. This example has been simplified for illustrative purposes and real world implementations may be expected to include many additional components as well as additional instances of the components shown.

In network 400 there is a client device 405 connected through an IP network link 135 (represented as a solid line) to IP switch device 410 which is in turn connected, again through an IP network link 135, to dual path host 415. Dual path host 415 may be any of the servers (e.g., application server, database server, storage server, etc.) referenced above with respect to FIG. 1. In this example dual path host 415 includes two independent HBA/CNA interfaces, namely HBA/CNA 1 416 and HBA/CNA 417. By having more than one interface, dual path host 415 may have redundant connections to either IP-based networks or FC networks (e.g., for redundancy or performance as mentioned above). In the example of network 400 dual path host 415 may have a third IP-based interface (not shown) to connect to the IP link 135 to IP switch device 410. Alternatively, one of the two CNA's illustrated for dual path host 415 may be used to connect to both the IP-based network and an FC network simultaneously. Different implementation possibilities exist.

Continuing with FIG. 4A, network 400 includes two independent FC fabrics, namely fabric A maintained, in this example, with FC switch 425 and fabric B maintained, in this example, with FC switch 420. Each of these fabrics may operate independently at the physical layer for redundancy and fault tolerance. However, when all components are operational, load may be shared across each of fabric A and fabric B to provide improved performance. Network 400 includes storage array 430 which has multiple communication ports to each of the FC fabrics. In this example, Port 1 431 is illustrated as connecting to fabric A, via an FC physical link 140 (illustrated as a dashed line), using FC switch 425. Port 2 432 is illustrated as connecting to fabric B, via a different FC physical link 140 using FC switch 420. Port N 435 is illustrated to indicate that storage array 430 may include any number of ports connected to any number of additional fabrics (not shown) or to provide additional connections to either fabric A or fabric B of network 400.

Network 400 also illustrates several example VFC connections (e.g., FC virtual links 440 as illustrated by dotted lines) between dual path host 415 and FC switches 420 and 425. Specifically, this example shows two VFCs between HBA/CNA 1 416 and FC switch 425 on fabric A, and a single VFC between HBA/CNA 2 417 and FC switch 420 on fabric B. Again, there may be any number of VFCs but only three are shown in network 400 for simplicity. As explained above, a VFC may represent a logical portion of a physical link "carved" out to support the VFC. For example, an 8 Gb physical link may be portioned into 4 logical VFCs of 1 Gb each and 8 logical VFCs of 500 Mb each concurrently. In this manner, a number of dedicated logical connections (of different bandwidths) may be supported across a single physical hardware connection. Using the techniques of this disclosure, VFCs on fabric A may be switched to have hardware paths on fabric B if any of the components in a current hardware communication path are predicted to fail or changes may cause a breach of a QoS mandate. It is also possible that a VFC may be switched to a different hardware path within the same fabric but use a different interconnection path within that same fabric.

Although not illustrated specifically in network 400, there is expected to be redundancy of hardware components within each of fabric A and fabric B for a real world implementation. Accordingly, techniques of this disclosure may prioritize keeping a migrated VFC within the same fabric over switching to a different fabric. Specifically, there may be another instance (not shown) of FC switch 425 on fabric A that represents a different hardware communication path to storage array 430. Thus, upon failure prediction, or other action indicating a need for migration, a VFC may be migrated to this other switch (still on fabric A) to provide communication for the VFC to storage array 430. Having this understanding, it should be clear that proper clearing of old information as part of migration may be an important aspect to maintain a properly functioning comprehensive SAN over time. That is, remnants of information from previous connections may cause issues over time when components fail over and support each other (e.g., load balance) within a redundant SAN.

In an FC SAN, the end devices, such as dual path host 415 (e.g., a server or host) and storage systems (e.g., storage array 430) are all referred to as nodes. Each node is a source or destination of information. Each node requires one or more network adapters (e.g., HBA/CNA 1 416) to provide a physical interface for communicating with other nodes. These devices may appear to each host operating system as SCSI adapters, and any storage volumes presented to the OS via them appear as locally attached SCSI devices. Both types of cards also offer hardware offloads for FCP operations, whereas CNA cards also offer hardware offloads of other protocols such as iSCSI and TCP/IP.

The commonly used interconnecting devices in FC SANs are FC hubs, FC switches (e.g., FC switch 425), and FC directors. FC switches and directors provide the connectivity between hosts and storage. Using switches for connectivity offers scalability as well as good performance and improved manageability. Switches provide fabric services to help partition the SAN and make it more manageable. Switches and directors provide connectivity between end devices such as hosts and storage. They operate at layers FC-0, FC-1, and FC-2 and provide full bandwidth between communicating end devices. They also provide various fabric services, some of which may be standard, and others may differ based on implementation, that simplify management and enable scalability. Also, if multiple FC switches are properly networked together, they merge and form a single common fabric. Each of these types of devices represent examples of components that are interconnecting components of a SAN and switching from a first hardware communication path to a second hardware communication path may include bypassing one of these components in favor of another instance of that component.

Figure 4B:
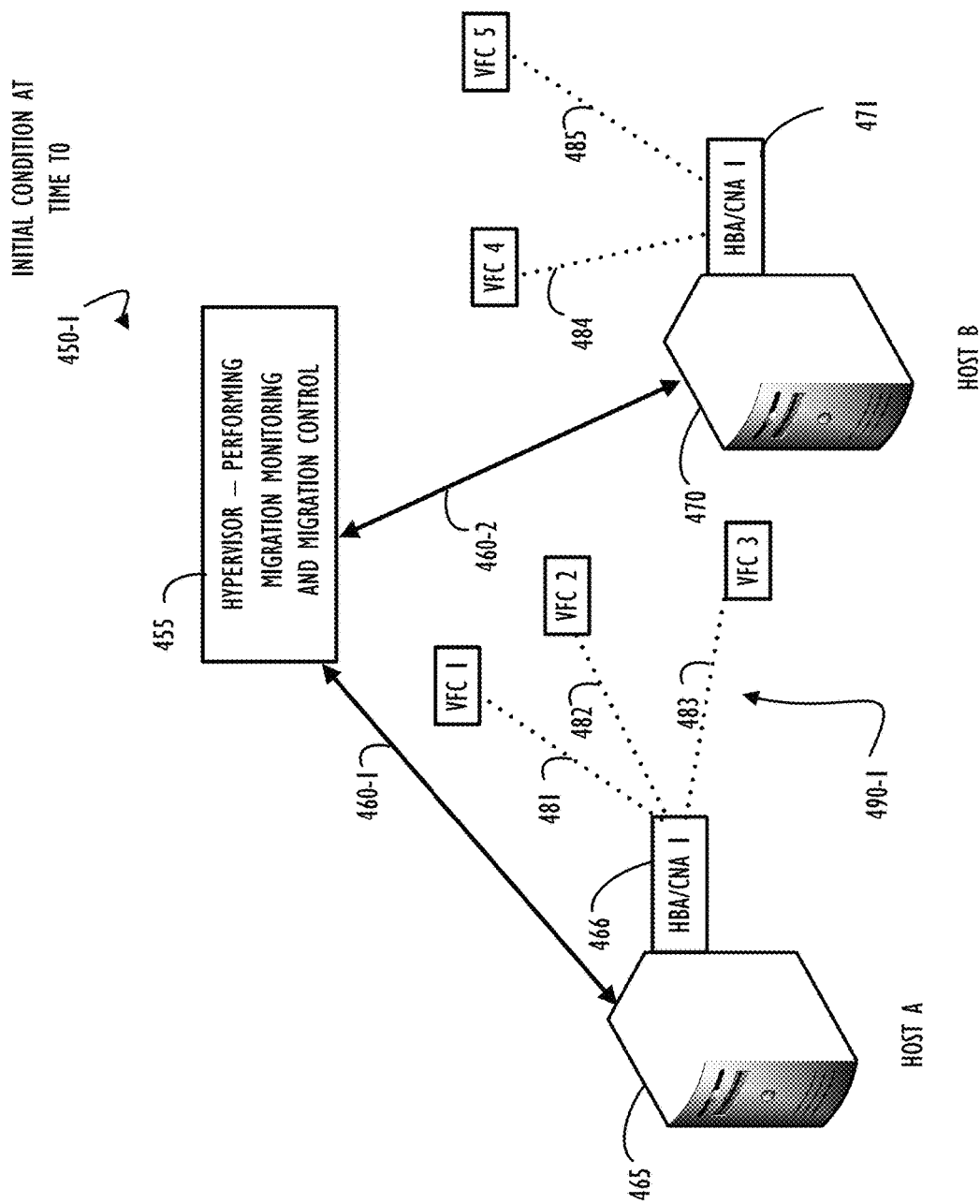
FIGS. 4B-4D are block diagram representations of an alternate to the distributed network environment of FIG. 4A used to illustrate migration of a VFC port from a first hardware communication path to a second hardware communication path (and optionally back to its initial condition), according to one or more disclosed implementations.
Figure 4C:
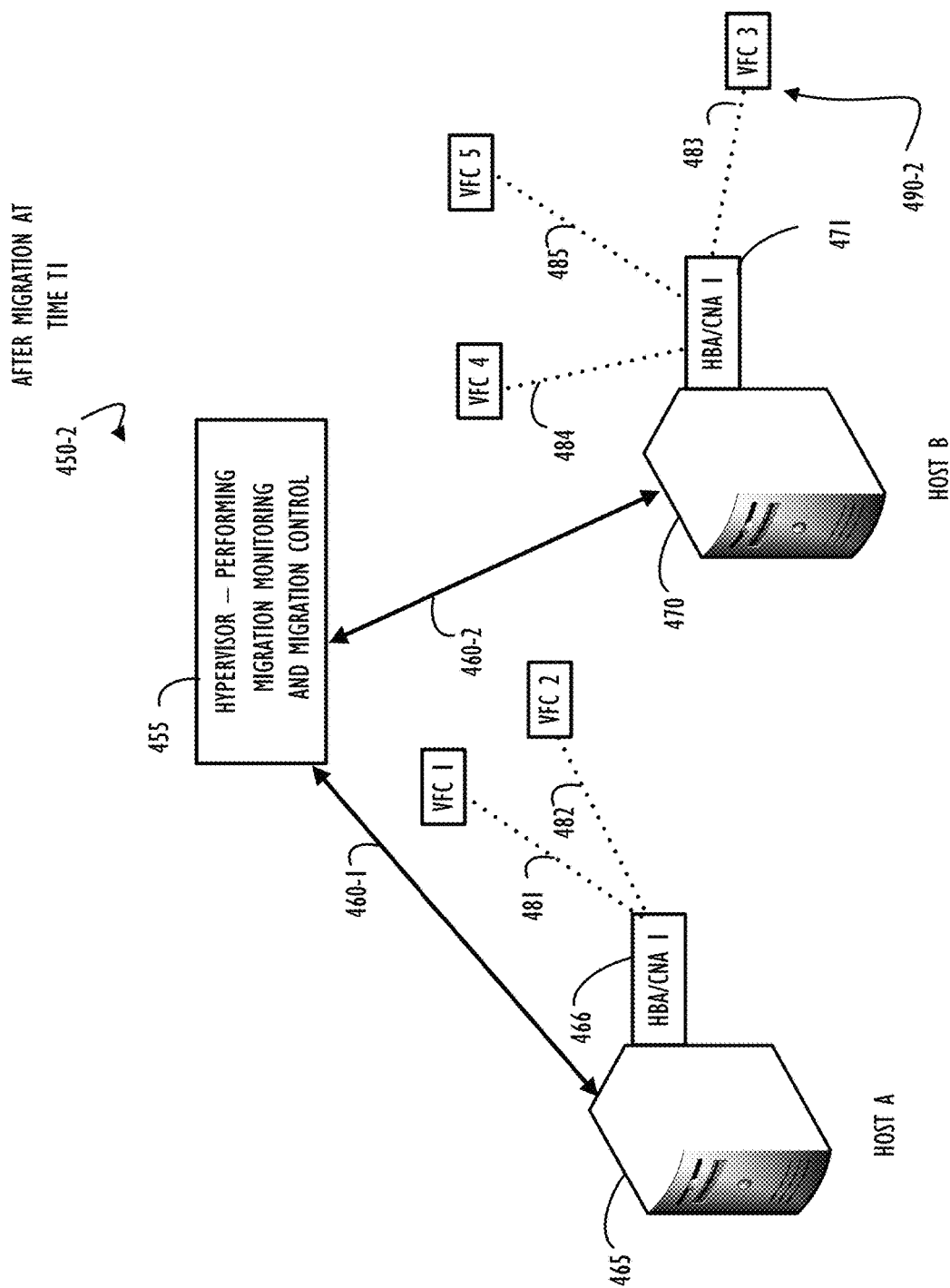
Figure 4D:
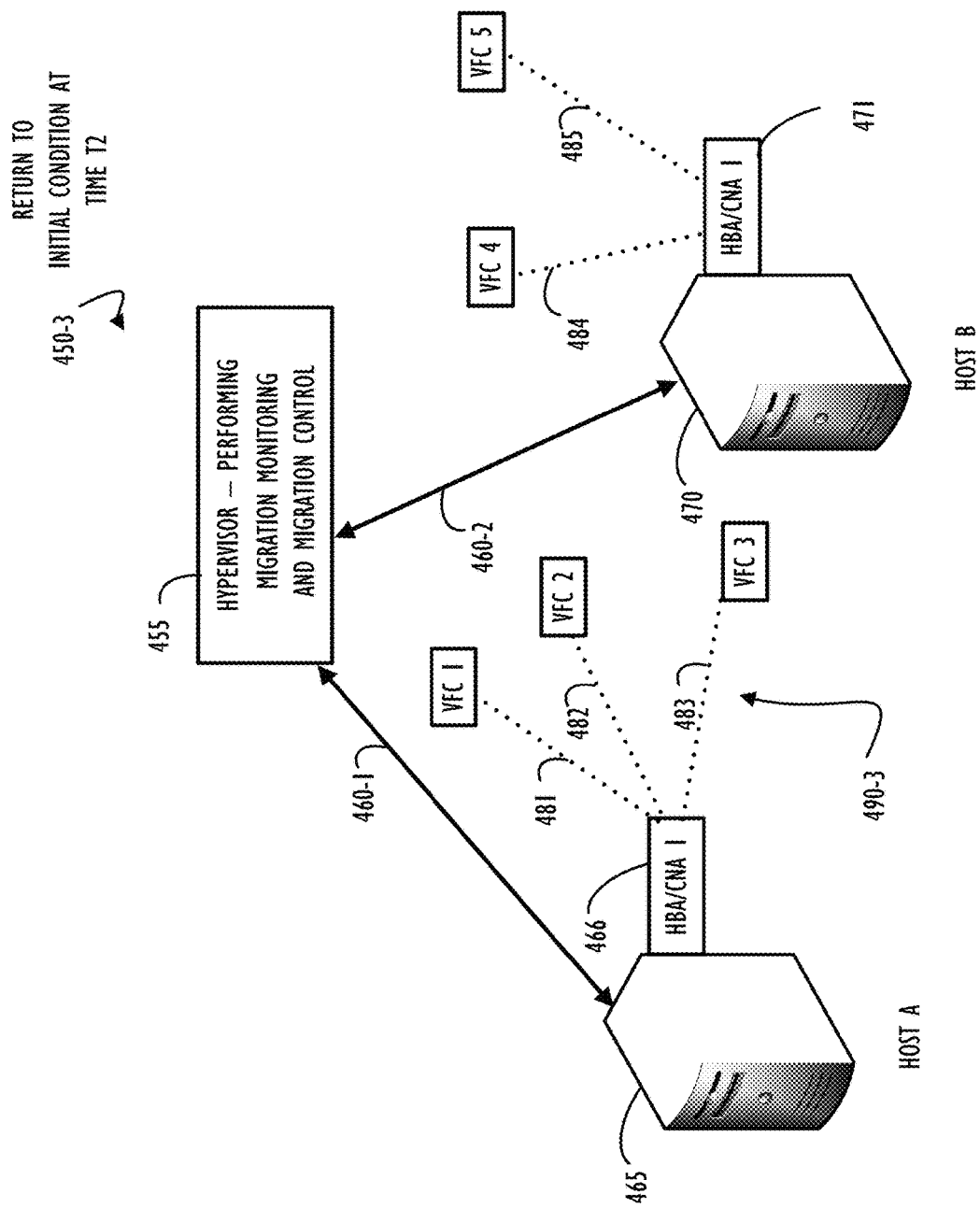

Referring now to FIGS. 4B-D, block diagram representations of network 450-1 through network 450-3 are used to illustrate an alternate to network 400. Each of these figures represents a different time with respect to migration of a VFC within a SAN environment. Specifically, the three diagrams are used to illustrate migration of a VFC port from a first hardware communication path to a second hardware communication path (and optionally back to its initial condition), according to one or more disclosed implementations.

Beginning with FIG. 4B, a first logical network configuration 450-1 is illustrated as an initial condition at time T0. In this example, host A 465 includes HBA/CNA 1 466 that initially supports three VFCs. Namely, VFC 1 480, VFC 2 483, and VFC 3 483. Host B 470 includes HBA/CNA 471 that initially supports two additional VFCs. Namely, VFC 4 484 and VFC 5 485. Note that VFC3 483 and its configuration within network 450-1 is referenced by element 490-1. Hypervisor 455 is also illustrated, in this example, as providing monitoring and migration control support for each of host A 465 (via arrow 460-1) and host B 470 (via arrow 460-2). In this manner, hypervisor 455 may maintain information as discussed above to initiate migration of a VFC (e.g., VFC 3 483) from a first hardware communication path to a second hardware communication path.

FIG. 4C illustrates the configuration of network 450-2 which represents a time T1 (after T0) where migration of VFC 3 483 has taken place. In this example, the migration of VFC 3 483 has moved it from host A 465 to host B 470 as illustrated by element 490-2. Thus, VFC 3 remains functional within a SAN environment but is supported by different infrastructure components of the network. As discussed above, migration may take place in a number of ways. Migration may move a VFC to a different HBA/CNA within a single host or may move the VFC to a completely different host (as in this example). Also, the migration may adjust a component of the network that is not the source or destination of the VFC (e.g., an interconnecting component as illustrated in FIG. 4A, such as switching from FC switch 425 to FC switch 420). The example of FIGS. 4B-C illustrate a migration that might occur if HBA/CNA 1 466 was predicted to fail and/or VFC 3 was determined to be sufficiently critical (e.g., because of a QOS mandate) to be proactively addressed.

FIG. 4D illustrates the configuration of network 450-3 which represents a time T2 (after T1) where migration of VFC 3 483 has been "undone." Alternatively, there may have been subsequent events that warrant a relocation of VFC 3 483 within the SAN. In the case of undoing a previous migration, the act of returning to the initial default configuration may be responsive to an indication that an issue in the network has been resolved. For example, if VFC 3 483 was migrated from host A 465 to host B 470 because of a change in port speed for HBA/CNA 1 466, then upon resolution of that (potentially inadvertent) port speed change, it may be desirable to return VFC 3 483 to its original configuration. If a port speed on an HBA/CNA (such as HBA/CNA 1 466) drops automatically, manual intervention may be required to reconfigure that port speed to its original configuration (the higher speed). Accordingly, if the port speed of HBA/CNA is consistent with desired settings, a return to a default network configuration may be desirable.

Figure 5A:
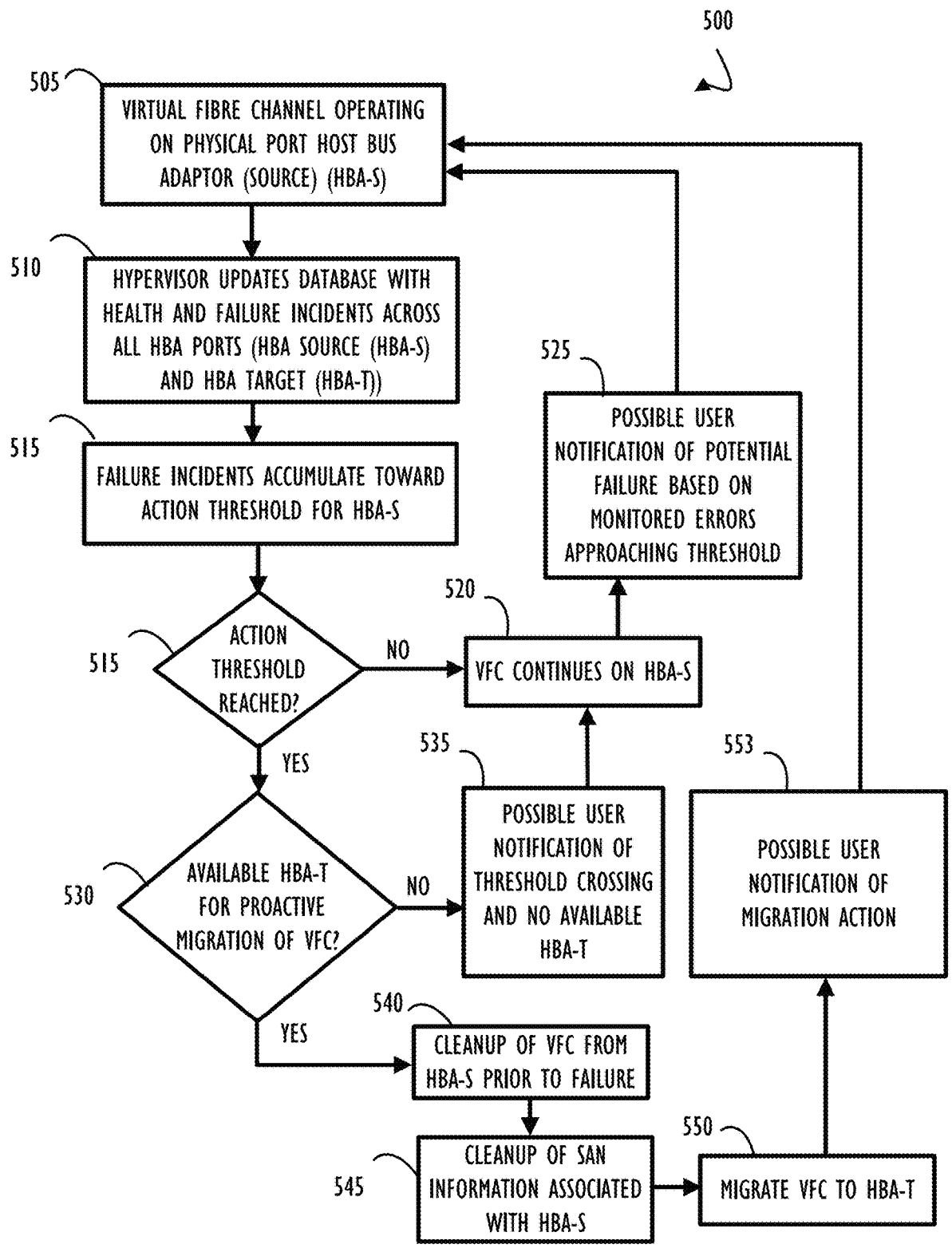
FIG. 5A is a flow chart representing a possible technique for virtual fibre channel (VFC) processing with respect to failure incidents (and predictive failure actions) for a device supporting a physical communication path (e.g., HBA and port), according to one or more disclosed implementations.

Referring now to FIG. 5A, a flow chart is illustrated to represent one possible method 500 to provide migration from a first hardware communication path to a second hardware communication path. For example, method 500 may be invoked based on a predicted hardware failure of a component within a first hardware communication path, according to one or more disclosed implementations. Beginning at block 505, a VFC is operating on a first physical port of a source HBA, in this example the source HBA is referred to as "HBA-S." Block 510 indicates that a hypervisor may update a database (e.g., used to track metrics and allocations of VFC ports and associated hardware devices in different possible hardware communication paths) to track an overall health status and recoverable failure incidents across all HBA ports for different HBAs including HBA-S and a target HBA (e.g., target for migration) for the particular VFC, in this example referred to as "HBA-T." HBA-T may represent a target HBA for which to migrate HBA-S based upon predicted failure of another component used by the VFC, for example. Block 515 indicates that failure incidents (e.g., recoverable transmission failures or other recoverable errors) may accumulate over time and approach a configurable error threshold for HBA-S (for example). Decision 515 indicates that a decision may be made with respect to HBA-S (or other hardware component being monitored that is associated with the VFC in question) as to if an action threshold has been reached. If not, the NO prong of decision 515, flow continues to block 520 where the VFC continues to communicate on the first hardware communication path using HBA-S. Block 525 indicates that possible user notification (e.g., system administrator notification) may be provided of potential failure based on monitored recoverable events approaching an action threshold. However, if the action threshold has been reached, the YES prong of decision 515, flow continues to decision 530 where a determination may be made if there is an available target HBA (HBA-T) for proactive migration of the VFC currently using HBA-S. If not, the NO prong of decision 530, flow continues to block 535 where possible notification of threshold crossing, and no available HBA-T may be provided to a system administrator. Flow then continues to block 520 as described above. However, if there is an available HBA-T, the YES prong of decision 530, flow continues to block 540 where a cleanup of the VFC from HBA-S (e.g., prior to actual failure of any component) may be initiated. Block 545 indicates that there may be a cleanup of SAN information (e.g., information on other devices in the SAN) associated with this VFC and HBA-S. Block 550 indicates that the VFC may be migrated to HBA-T and a system administrator notified of the migration action (block 553). Thus, the VFC may have been cleanly rerouted from HBA-S (part of the first hardware communication path) to HBA-T (part of the second hardware communication path that is not in the first hardware communication path) proactively. Clearly, the steps of migration and cleanup (blocks 540-550) should be performed in a sequence to ensure availability of the VFC. Accordingly, some portions of cleanup and migration may be performed in an interleaved manner such that, after completion of the migration portion no unintended data regarding the original first hardware communication path for the VFC is maintained on devices within the SAN.

Figure 5B:
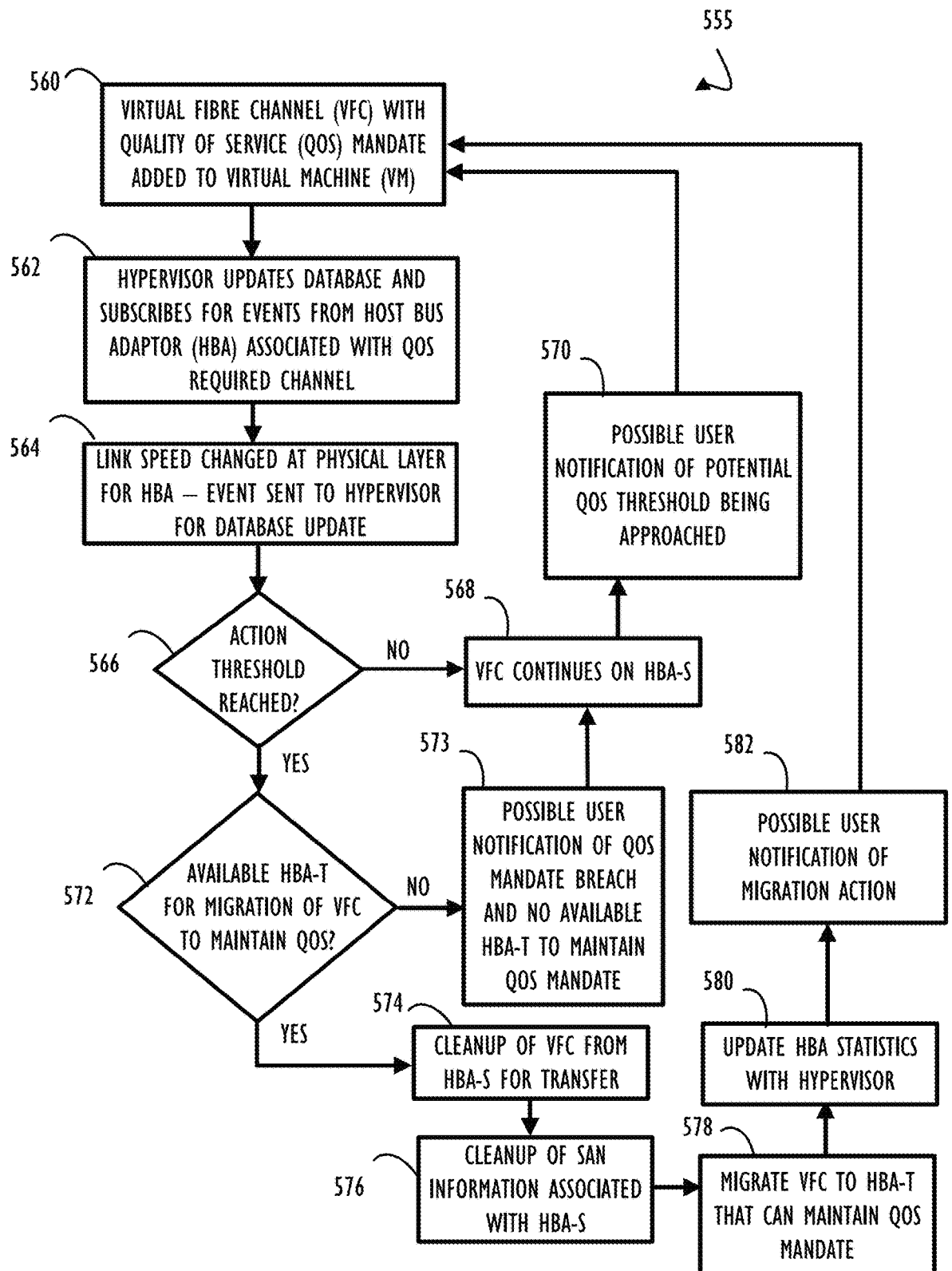
FIG. 5B is a flow chart representing a possible technique for VFC processing (e.g., migration and cleanup) with respect to maintenance of a quality of service (QOS) mandate for a communication path, according to one or more disclosed implementations.

FIG. 5B is a flow chart representing a possible method 555 to provide migration from a first hardware communication path to a second hardware communication path. For example, the migration may be based on a QoS concern with respect to operational parameter changes for a component within a first hardware communication path, according to one or more disclosed implementations. Beginning at block 560, a VFC is added for operation on a first physical port of a source HBA (referred to as HBA-S) and associated with a QoS mandate. Block 562 indicates that a hypervisor may update a database (e.g., used to track metrics and allocations of VFC ports and associated hardware devices in different possible hardware communication paths) to track an overall health status (including QoS mandates) and operational metrics across all HBA ports for different HBAs including HBA-S and a target HBA (HBA-T) for the particular VFC. HBA-T may represent a target HBA for which to migrate HBA-S based upon concern over violation of a QoS mandate, for example. Block 564 indicates that an indication about a change at the physical layer regarding configuration throughput (speed) of an HBA port may cause an event to be sent to the hypervisor (for example). Decision 566 indicates that a decision may be made with respect to HBA-S (or other hardware component being monitored that is associated with the VFC in question) as to if an action threshold has been reached. If not, the NO prong of decision 566, flow continues to block 560 where the VFC continues to communicate on the first hardware communication path using HBA-S. Block 570 indicates that possible user notification may be provided, for example notification to a system administrator, of a potential QoS threshold approaching an action threshold. However, if the action threshold has been reached, the YES prong of decision 566, flow continues to decision 572 where a determination may be made if there is an available target HBA-T for proactive migration of the VFC currently using HBA-S (e.g., the proactive migration intended to maintain a QoS mandate). If not, the NO prong of decision 530, flow continues to block 573 where possible notification of threshold crossing, and no available HBA-T may be provided to a system administrator. Flow then continues to block 568 as described above. However, if there is an available HBA-T, the YES prong of decision 572, flow continues to block 574 where a cleanup of the VFC from HBA-S prior to QoS mandate violation may be initiated. Block 576 indicates that there may be a cleanup of SAN information (e.g., information on other devices in the SAN) associated with this VFC and HBA-S. Block 578 indicates that the VFC may be migrated to HBA-T that can maintain the QoS mandate. Block 580 indicates that the hypervisor may update its statistics information and a system administrator notified of the migration action (block 582). Thus, the VFC may have been cleanly rerouted from HBA-S (in the first hardware communication path) to HBA-T (in the second hardware communication path) proactively. Clearly, the steps of migration and cleanup (blocks 574-580) should be performed in a sequence to ensure availability of the VFC. Accordingly, some portions of cleanup and migration may be performed in an interleaved manner such that, after completion of the migration portion no unintended data regarding the original first hardware communication path for the VFC is maintained on devices within the SAN.

Figure 5C:
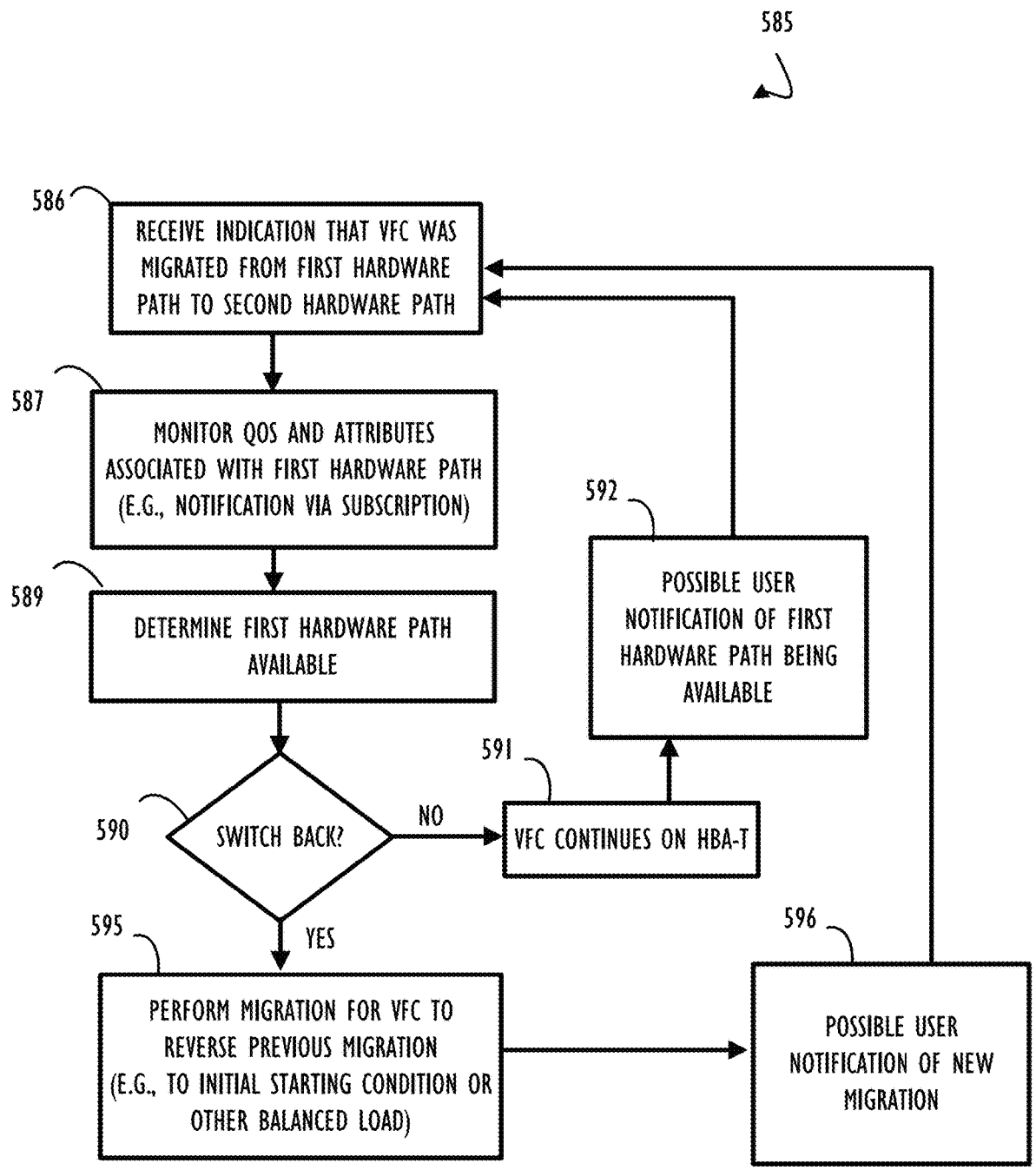
FIG. 5C is a flow chart representing a possible technique for VFC processing to determine if a return to an initial condition (e.g., a migration back after an automatic migration) may be desired (e.g., to rebalance load to its default devices), according to one or more disclosed implementations.

FIG. 5C is a flow chart representing a possible method 585 to provide migration in a reverse direction to restore an initial network configuration. For example, errors that initiated a proactive migration of a VFC have been addressed and migration back to a default condition may be desirable. Method 585 begins at block 586 where it may be determined (e.g., via manual initiation or automatic determination) that a VFC has been migrated from its default configuration to a second hardware communication path (e.g., temporarily migrated). Block 587 indicates that QOS attributes and error counts may be monitored, for example by a hypervisor, to determine an overall status (and perform predictive analysis with respect to status) for components associated with the VFC. For example, events can be provided either through unsolicited alerts or in response to a subscription for notification of events. Block 589 indicates that availability of the first hardware path has returned. For example, because enough time has passed with no more recoverable errors identified, after a restart of a component, or because of manual intervention to correct port speed settings. Decision 590 indicates that a determination may be made as to switching back to the first hardware path. If not, the NO prong of decision 590, flow continues to block 591 where the VFC continues to operate in its migrated path (e.g., the second hardware communication path). Block 592 indicates that a notification may be sent that the first hardware communication may be available but a switch back to default configuration for the VFC will not take place at this time. Alternatively, if at decision 590 a determination is made to switch back, the YES prong of decision 590, flow continues to block 595 where a migration of the VFC back to its default configuration may take place. Specifically, migration of the VFC from the second hardware communication path back to the first hardware communication path may be initiated. Note, that it is not required that a migration back as described in method 585 be to exactly the first hardware communication path. For example, the reverse migration may return the VFC to an original HBA-S but the resultant connection may go through a different interconnecting component (e.g., a different switch or router). Thus, throughput loads may be rebalanced back to their default configuration with respect to hosts. Finally, block 596 indicates that possible user notification about the return migration may be provided, for example, to a system administrator.

Figure 6:
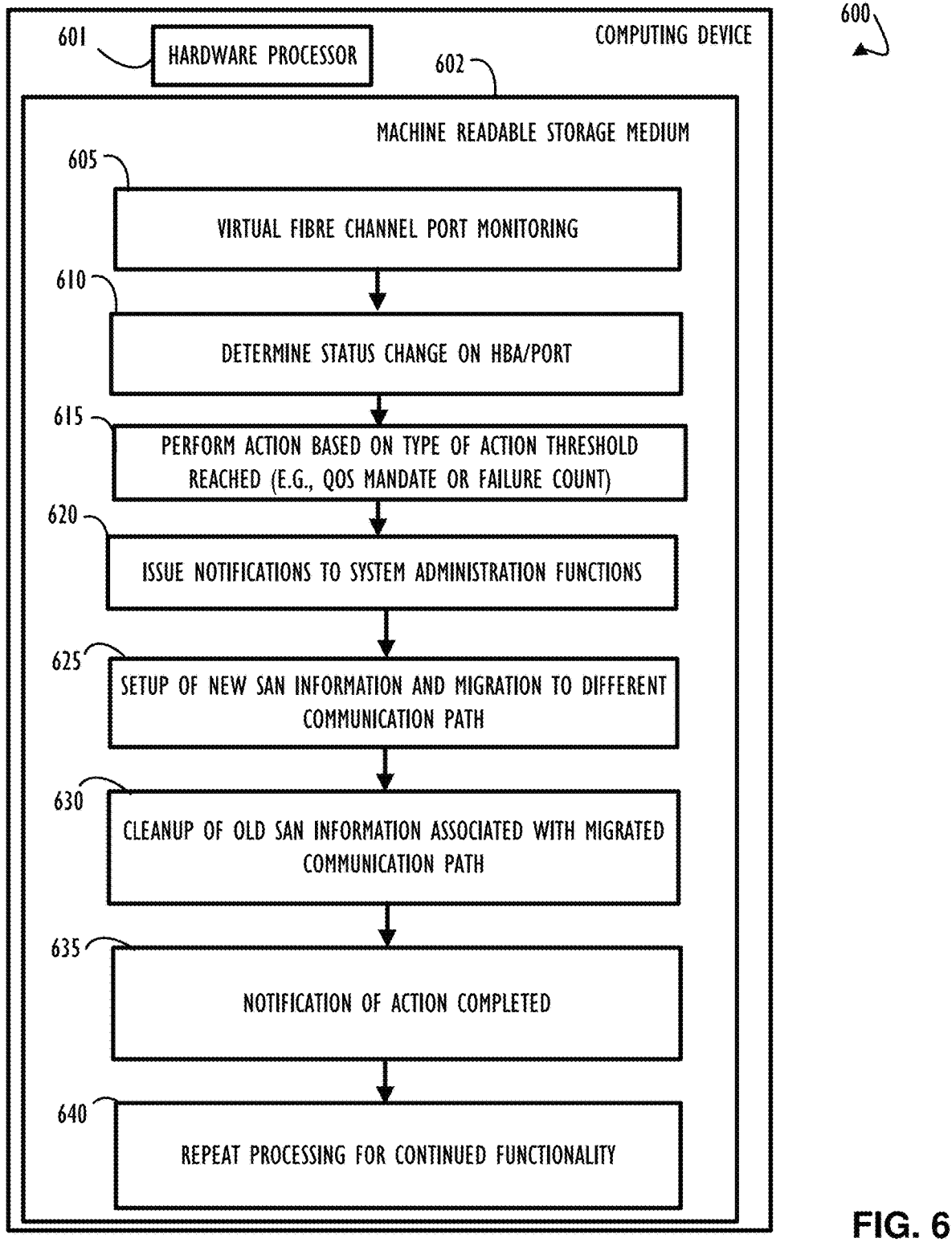
FIG. 6 is a block diagram representing a computing device implementing a technique to provide VFC processing for either QOS or failure prediction (e.g., migration prior to actual failure), according to one or more disclosed implementations.

FIG. 6 is a block diagram representing a computing device 600 to support proactive VFC migration based on event monitoring within a SAN, according to one or more disclosed implementations. Computing device 600 includes at least one hardware processor 601 and a machine readable storage medium 602. As illustrated, machine readable medium 602 may store instructions, that when executed by hardware processor 601 (either directly or via emulation/virtualization), cause hardware processor 601 to perform one or more disclosed techniques to migrate virtual fibre channel ports proactively based on possible future failure or violation of a QOS mandate. In this example, the instructions stored reflect a method similar to method 500 discussed above.

Beginning at block 605, the stored instruction may be directed toward virtual fibre channel monitoring and migration based on a QOS mandate or detected events indicating potential hardware failure, according to one or more disclosed implementations. For example, there may be instructions to cause the hardware processor to monitor one or more virtual fibre channel ports (e.g., a hardware communication path for the virtual fibre channel port). Block 610 indicates that the instructions may cause the hardware processor to determine a status change on an HBA that may affect a port. For example, there may have been an event indicating a communication error on the HBA. As another example, there may be an event indicating that the physical port speed has been reduced (or increased). A reduction in physical port speed may further be determined by the hardware processor that a QOS mandate may be jeopardized or may be close to not being satisfied. Block 615 indicates that a "recovery" action may be initiated based on the determination (e.g., an action threshold crossing). In this example, recovery is proactive as there may not have been an actual failure (or violation of QOS mandate) at this point. That is, there may be a forward looking migration of a virtual fibre channel port so that there is no actual loss of communication or violation of a QOS mandate. Of course, there may also have been an actual failure or violation and a similar migration may take place.

Block 620 indicates that notification may be issued as appropriate based on the actions taken to initiate a migration of a virtual fibre channel port from one hardware communication path to another. This notification may be issued to alert a system administrator function (e.g., a system administration computer service) of the change in configuration. Block 625 indicates that a setup of new SAN information, for example, to support the new hardware communication path for the virtual fibre channel port, may be performed. Block 630 indicates that cleanup of old SAN information may be performed as part of the migration to the new hardware communication path. By cleaning up old information prior to an actual failure of a device overall system configuration information may remain more accurate. Specifically, sometimes when a device experiences an actual failure it is not possible to clear old information associated with that device. Thus, a proactive cleaning of the information while the device is still functioning (albeit in a possibly degraded state) may provide an improvement to the functioning of the computer network and individual computer systems on the network. Block 635 indicates that a notification of action completed may be provided. For example, a notification may be provided to a system administration function to indicate if cleanup of old information was successful or to indicate a completed successful migration. Block 640 indicates that after a completed migration the processing may return to a monitoring of a functioning virtual fibre channel port on the new hardware communication path (as well as continued monitoring of other ports both hardware and virtual).

Figure 7:
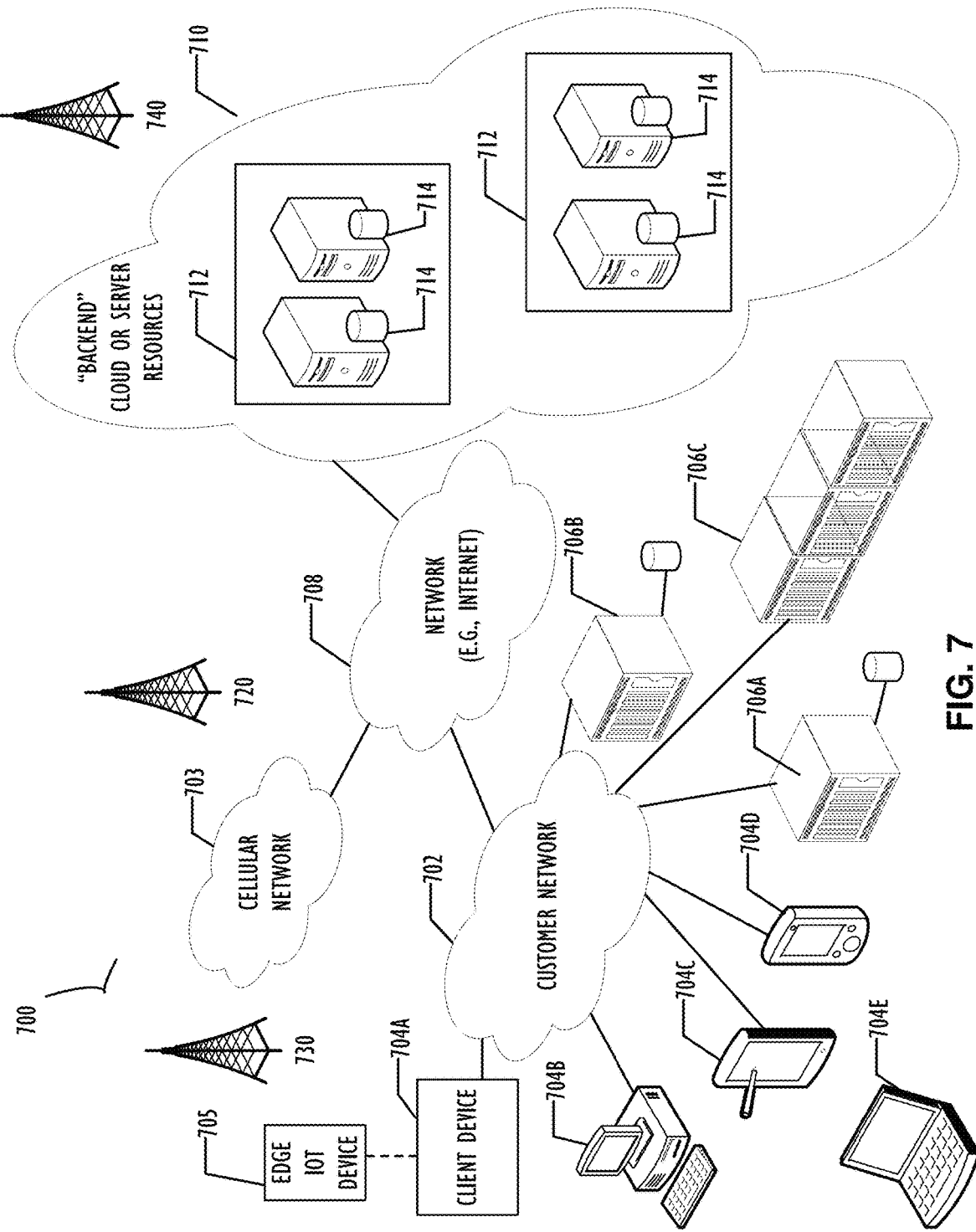
FIG. 7 represents a computer network infrastructure that may be used to implement all or part of the disclosed VFC processing, according to one or more disclosed implementations.

FIG. 7 represents a computer network infrastructure that may be used to implement all or part of the disclosed QOS and proactive failure detection migration of virtual fibre channel ports, according to one or more disclosed implementations. In these example, proactive failure detection refers to identifying a failure prior to an absolute hard failure of a network device. That is, it is common that a number of soft failures (e.g., recoverable errors) may occur for a computer device prior to that device actually failing and becoming unresponsive (hard failure). Disclosed techniques therefore may be used in a complicated network, such as network infrastructure 700, to improve overall reliability of network communications when or if those devices ultimately fail. Network infrastructure 700 includes a set of networks where implementations of the present disclosure may operate, including the disclosed virtual fibre channel port migration techniques. For example, there may be multiple servers supporting data storage implemented within hardware clusters that have nodes at different locations (e.g., data centers) and those data centers may communicate with each other through network infrastructure 700. Network infrastructure 700 comprises a customer network 702, network 708, cellular network 703, and a cloud service provider network 710. Any of these networks may have nodes providing or receiving FCP messages from servers and/or network devices configured in accordance with this disclosure. That is, each of these different networks may include one or more HBAs or CNAs on a network communication device that may benefit from the concepts of this disclosure. In one implementation, the customer network 702 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another implementation, customer network 702 represents an enterprise network that could include or be communicatively coupled to one or more local area networks (LANs), virtual networks, data centers and/or other remote networks (e.g., 708, 710). In the context of the present disclosure, customer network 702 may include one or more high-availability data stores (e.g., quorum data store), switches, or network devices using methods and techniques such as those described above.

As shown in FIG. 7, customer network 702 may be connected to one or more client devices 704A-E and allow the client devices 704A-E to communicate with each other and/or with cloud service provider network 710, via network 708 (e.g., Internet). Client devices 704A-E may be computing systems such as desktop computer 704B, tablet computer 704C, mobile phone 704D, laptop computer (shown as wireless) 704E, and/or other types of computing systems generically shown as client device 704A. In this context, client devices should not be confused with a client application of a server-based application (or distributed application) because they represent devices in a client-server architecture rather than applications. However, while it is true that client devices may often run client applications, there are situations where a client device will execute the server side of a client-server application such that the client device communicates with a server device (e.g., executing the client application) to request remote execution on behalf of the client device. That is, the client device may execute a server application portion with the server device executing the client application portion for a given client-server application architecture. In general, the client portion of an application is the portion that requests some work and receives the results of the work, with the server portion receiving the request for work, performing that work, and providing the results.

Network infrastructure 700 may also include other types of devices generally referred to as Internet of Things (IoT) (e.g., edge IOT device 705) that may be configured to send and receive information via a network to access cloud computing services or interact with a remote web browser application (e.g., to receive configuration information).

FIG. 7 also illustrates that customer network 702 includes local compute resources 706A-C that may include a server (e.g., a data storage server for a SAN), access point, router, or other device configured to provide for local computational resources and/or facilitate communication amongst networks and devices. For example, local compute resources 706A-C may be one or more physical local hardware devices to support a migration from one virtual fibre channel port on a first hardware communication path to a different hardware communication path (e.g., based on QOS mandate or potential failure detection) as outlined above. Local compute resources 706A-C may also facilitate communication between other external applications, data sources (e.g., 707A and 707B), and services, and customer network 702.

Network infrastructure 700 also includes cellular network 703 for use with mobile communication devices. Mobile cellular networks support mobile phones and many other types of mobile devices such as laptops etc. Mobile devices in network infrastructure 700 are illustrated as mobile phone 704D, laptop computer 704E, and tablet computer 704C. A mobile device such as mobile phone 704D may interact with one or more mobile provider networks as the mobile device moves, typically interacting with a plurality of mobile network towers 720, 730, and 740 for connecting to the cellular network 703. Because of the distributed nature of SAN, the disclosed implementations may be distributed over large geographic areas to support delivery of data to cellular devices.

FIG. 7 illustrates that customer network 702 is coupled to a network 708. Network 708 may include one or more computing networks available today, such as other LANs, wide area networks (WAN), the Internet, and/or other remote networks, in order to transfer data between client devices 704A-D and cloud service provider network 710. Each of the computing networks within network 708 may contain wired and/or wireless programmable devices that operate in the electrical and/or optical domain.

In FIG. 7, cloud service provider network 710 is illustrated as a remote network (e.g., a cloud network) that is able to communicate with client devices 704A-E via customer network 702 and network 708. The cloud service provider network 710 acts as a platform that provides additional computing resources to the client devices 704A-E and/or customer network 702. In one implementation, cloud service provider network 710 includes one or more data centers 712 with one or more server instances 714. Cloud service provider network 710 may also include one or more frames or clusters (and cluster groups) representing a scalable compute resource that may benefit from the techniques of this disclosure. Also, cloud service providers typically require near perfect uptime availability and may use the disclosed techniques, methods, and systems to provide that level of service.

Figure 8:
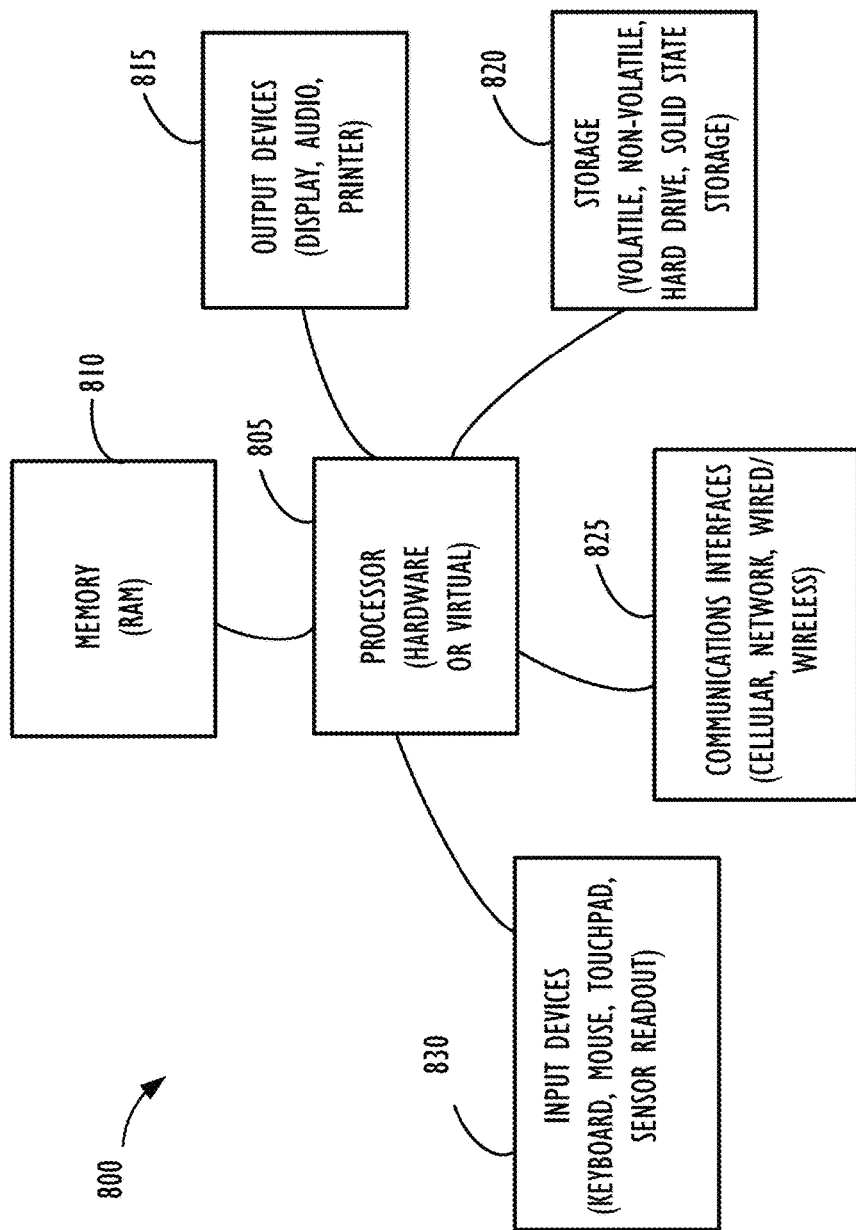
FIG. 8 illustrates a computer processing device that may be used to implement the functions, modules, processing platforms, execution platforms, communication devices, and other methods and processes of this disclosure.

FIG. 8 illustrates a computing device 800 that may be used to implement or be used with the functions, modules, processing platforms, execution platforms, communication devices, and other methods and processes of this disclosure. For example, computing device 800 illustrated in FIG. 8 could represent a client device or a physical server device as illustrated in either of FIG. 1 or 4. Each device may include either hardware or virtual processor(s) depending on the level of abstraction of the computing device. Specifically, each of the storage servers, application servers, network devices, and other processing devices discussed above may be considered instances of a computing device similar to computing device 800. Accordingly, multiple instances of computing device 800 and processor 805 may be used to implement the above disclosed methods and systems for a SAN that includes a QOS or proactive error detection migration of virtual fibre channel ports to increase availability and maintenance of SLAs. In some instances (without abstraction), computing device 800 and its elements, as shown in FIG. 8, each relate to physical hardware. Alternatively, in some instances one, more, or all of the elements could be implemented using emulators or virtual machines as levels of abstraction. In any case, no matter how many levels of abstraction away from the physical hardware, computing device 800 at its lowest level may be implemented on physical hardware.

As also shown in FIG. 8, computing device 800 may include one or more input devices 830, such as a keyboard, mouse, touchpad, or sensor readout (e.g., biometric scanner) and one or more output devices 815, such as displays, speakers for audio, or printers. Some devices may be configured as input/output devices also (e.g., a network interface or touchscreen display).

Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 8, computing device 800 includes a processing element such as processor 805 that contains one or more hardware processors, where each hardware processor may have a single or multiple processor cores. In one implementation, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more implementations, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) and a microprocessor. Although not illustrated in FIG. 8, the processing elements that make up processor 805 may also include one or more of other types of hardware processing components, such as graphics processing units (GPU), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random-access memory (RAM), can be any suitable non-permanent storage device. The non-volatile storage devices 820 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one implementation, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage device 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 800 may comprise other components well known in the art, such as sensors, powers sources, and/or analog-to-digital converters, not explicitly shown in FIG. 8.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer-implemented method of migrating a virtual fibre channel (VFC) connection from a first hardware communication path to a second hardware communication path within a fibre channel (FC) network, the method comprising:
   maintaining, by a hypervisor, a database storing state information associated with the VFC connection, wherein the VFC connection comprises a virtual FC port, wherein the virtual FC port is within a source physical host bus adaptor (HBA) port which is part of the first hardware communication path used by the VFC connection;
   tracking, by the hypervisor, a set of performance metrics for the source physical HBA port and a target physical HBA port which is part of the second hardware communication path; and
   in response to determining, by the hypervisor, that a performance metric associated with the first hardware communication path exceeds an action threshold which indicates that a failure incident is likely to occur on the first hardware communication path,
      identifying, by the hypervisor, available components associated with the second hardware communication path capable of supporting the VFC connection; and
      migrating, by the hypervisor, the virtual FC port from the source physical HBA port to the target physical HBA port, thereby migrating the VFC connection from the first hardware communication path to the second hardware communication path, wherein the source physical HBA port remains active subsequent to the migration of the virtual FC port.

2. The computer-implemented method of claim 1, wherein all components associated with the first hardware communication path remain active in the FC network after migration of the VFC connection.

3. The computer-implemented method of claim 1, wherein the action threshold is associated with recoverable communication errors.

4. The computer-implemented method of claim 1, wherein the failure incident and action threshold are each associated with an event indicating a change in performance of the source physical HBA port.

5. The computer-implemented method of claim 4, wherein the event indicating a change in performance represents a reduction in port speed for the source physical HBA port.

6. The computer-implemented method of claim 5, wherein the reduction in port speed indicates jeopardy for a quality of service (QoS) mandate associated with the first VFC connection.

7. The computer-implemented method of claim 6, wherein migration of the first VFC connection from the first hardware communication path to the second hardware communication path is completed to maintain the QoS mandate prior to violation of the QoS mandate.

8. The computer-implemented method of claim 1, wherein migration of the first VFC connection from the first hardware communication path to the second hardware communication path comprises clearing attributes associated with the first VFC connection from components in the first hardware communication path.

9. The computer-implemented method of claim 1, wherein the first hardware communication path and the second hardware communication path have at least one component in common.

10. The computer-implemented method of claim 9, wherein the at least one component represents an error free component of the first hardware communication path.

11. The computer-implemented method of claim 1, wherein the first hardware communication path utilizes one or more components independent of the second hardware communication path.

12. A computer device, comprising:
   a hardware processor;
   a first network controller communicatively coupled to the first hardware processor and a first network;
   a persistent memory storage area communicatively coupled to the first hardware processor; and
   an instruction memory area communicatively coupled to the first hardware processor, wherein the instruction memory area stores instructions, that when executed by the first hardware processor, cause the first hardware processor to:
      maintain, as a hypervisor, a database storing state information associated with a VFC connection, wherein the VFC connection comprises a virtual FC port, wherein the virtual FC port is within a source physical HBA port which is part of a first hardware communication path used by the VFC connection;
      track, by the hypervisor, a set of performance metrics for the source physical HBA port and a target physical HBA port which is part of a second hardware communication path;
      in response to determining, by the hypervisor, that a performance metric associated with the first hardware communication path exceeds an action threshold which indicates that a failure incident is likely to occur on the first hardware communication path,
         identify, by the hypervisor, available components associated with the second hardware communication path capable of supporting the VFC connection; and
         migrate, by the hypervisor, the virtual FC port from the source physical HBA port to the target physical HBA port, thereby migrating the VFC connection from the first hardware communication path to the second hardware communication path, wherein the source physical HBA port remains active subsequent to the migration of the virtual FC port.

13. The computer device of claim 12, wherein all components associated with the first hardware communication path remain active in the FC network after migration of the VFC connection.

14. The computer device of claim 12, wherein the action threshold is associated with recoverable communication errors.

15. The computer device of claim 12, wherein the action threshold is associated with an event indicating a change in performance of the source physical HBA port.

16. The computer device of claim 15, wherein the event indicating the change in performance represents a reduction in port speed for the source physical HBA port.

17. The computer device of claim 16, wherein the reduction in port speed indicates jeopardy for a quality of service (QoS) mandate associated with the VFC connection.

18. A non-transitory computer readable medium comprising computer executable instructions stored thereon that when executed by one or more hardware processors, cause the one or more hardware processors to:
    maintain, as a hypervisor, a database storing state information associated with a VFC connection, wherein the VFC connection comprises a virtual FC port, wherein the virtual FC port is within a source physical HBA port which is part of a first hardware communication path used by the VFC connection;
    track, by the hypervisor, a set of performance metrics for the source physical HBA port and a target physical HBA port which is part of a second hardware communication path; and
    in response to determining, by the hypervisor, that a performance metric associated with the first hardware communication path exceeds an action threshold which indicates that a failure incident is likely to occur on the first hardware communication path,
    identify, by the hypervisor, available components associated with the second hardware communication path capable of supporting the VFC connection; and
    migrate, by the hypervisor, the virtual FC port from the source physical HBA port to the target physical HBA port, thereby migrating the VFC connection from the first hardware communication path to the second hardware communication path, wherein the source physical HBA port remains active subsequent to the migration of the virtual FC port.

19. The non-transitory computer readable medium of claim 18, wherein the action threshold is associated with an event indicating a change in performance of the source physical HBA port.

20. The non-transitory computer readable medium of claim 19, wherein the event indicating a change in performance represents a reduction in port speed for the source physical HBA port.

\* \* \* \* \*